US008125540B2

United States Patent
Yi et al.

(10) Patent No.: US 8,125,540 B2
(45) Date of Patent: Feb. 28, 2012

(54) VIDEO PRESENTING SYSTEM HAVING OUTPUTS FOR DUAL IMAGES

(75) Inventors: Jin-wook Yi, Changwon (KR); Si-yeon Park, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 370 days.

(21) Appl. No.: 12/468,900

(22) Filed: May 20, 2009

(65) Prior Publication Data

US 2010/0053341 A1    Mar. 4, 2010

(30) Foreign Application Priority Data

Sep. 4, 2008   (KR) .................. 10-2008-0087427

(51) Int. Cl.
*H04N 5/262* (2006.01)
*H04N 1/10* (2006.01)

(52) U.S. Cl. ....................................... 348/239
(58) Field of Classification Search .................. 348/239, 348/705, 584, 589
See application file for complete search history.

(56) References Cited

U.S. PATENT DOCUMENTS

| | | | | |
|---|---|---|---|---|
| 4,218,709 A | * | 8/1980 | Baxter et al. .................. 348/584 |
| 5,633,678 A | * | 5/1997 | Parulski et al. ............... 348/239 |
| 5,767,897 A | * | 6/1998 | Howell ...................... 348/14.07 |
| 6,249,309 B1 | * | 6/2001 | Shibata et al. ................. 725/105 |
| 2006/0055781 A1 | * | 3/2006 | Yi et al. ....................... 348/207.1 |
| 2006/0221188 A1 | * | 10/2006 | Moon ............................ 348/239 |
| 2007/0064125 A1 | * | 3/2007 | Didow et al. ................... 348/239 |
| 2009/0051756 A1 | * | 2/2009 | Trachtenberg et al. ..... 348/14.08 |
| 2009/0059094 A1 | * | 3/2009 | Yi et al. ......................... 348/744 |

\* cited by examiner

*Primary Examiner* — Jason Whipkey
(74) *Attorney, Agent, or Firm* — Drinker Biddle & Reath LLP

(57) ABSTRACT

A video presenting system having outputs for dual images is provided. As a result, the video presenter, which is an optical image electronic device having mounted therein an embedded system dedicated to a device control, can respectively and simultaneously output any two different images to two different display units. These any two different images are from among an externally input image, a live image, and a document/multimedia image. The video presenting system having outputs for dual images includes a first display member; a second display member; a video presenting member generating a live image signal and outputting a dual-display signal after performing signal processing of a live image signal, an externally input image signal, and a document/multimedia image signal; and an embedded member performing periodic communication with the video presenting member, and thus transmitting the externally input image signal and the document/multimedia image signal to the video presenting member.

6 Claims, 6 Drawing Sheets

VIDEO PRESENTING SYSTEM HAVING OUTPUTS FOR DUAL IMAGES

CROSS-REFERENCE TO RELATED PATENT APPLICATION

This application claims the benefit of Korean Patent Application No. 10-2008-0087427, filed on Sep. 4, 2008 in the Korean Intellectual Property Office, the entire contents of which is incorporated herein by reference.

BACKGROUND OF THE INVENTION

1. Field of the Invention

The present invention relates to a video presenting system. More particularly, the present invention relates to a video presenting system having outputs for dual images so that a video presenter, which is an optical image electronic device having mounted therein an embedded system dedicated to a device control, can respectively and simultaneously output any two different images to two different display units, these any two different images being images from among an externally input image, a live image, and a document/multimedia image.

2. Description of the Related Art

An output method generally used in personal computers (PCs) is known as a dual display mode. However, such a dual-display mode is typically dedicated to the use of two different monitors as one single "monitor." Also, in this regard, the original resolution (for example, 2560×900) is divided in up/down or right/left directions so as to be displayed on two different monitors (for example, 1280×900+1280×900). When two different applications are output to the two different monitors, a user may conceive that the two monitors respectively output two different images. However, ultimately, the dual-display mode is based on a concept that one video source is divided and displayed on two displays.

A video presenter, which was designed as a tool for conducting studies, meetings, and/or presentations, has been frequently used in conjunction with a PC for presentation. At this time, the video presenter is utilized in such a manner that an image output from an external PC is input to the video presenter so that the video presenter selects and outputs one of an image in the video presenter and the external input signal.

The video presenter includes a digital visual interface (DVI) port having a digital output and a d type-sub miniature (D-SUB) port having an analog output, as output ports for displaying an image on a monitor. Images that are respectively output from such two output ports of the video presenter are the same as each other, and a user selects whether to utilize the digital output or to utilize the analog output according to the type of monitor used. This means that, even though the video presenter includes a plurality of output ports, images to be output are merely the same images having differing only in their video formats.

SUMMARY OF THE INVENTION

The present invention provides a video presenting system having outputs for dual images so that a video presenter can respectively and simultaneously output any two different images to two different display units. In this system, the any two different images are from among an externally input image, a live image, and a document/multimedia image.

According to an embodiment of the present invention, a video presenting system is provided having outputs for dual images. The video presenting system includes a first display member; a second display member; a video presenting member generating a live image signal, and outputting a dual-display signal after performing signal processing of the live image, an externally input image signal, and a document/multimedia image signal; and an embedded member performing periodic communication with the video presenting member, and thus transmitting the externally input image signal and the document/multimedia image signal to the video presenting member. The video presenting member includes a video graphics array (VGA) engine outputting a video graphic image signal after performing signal processing of the live image signal and the document/multimedia image signal which is received from the embedded member; and an image output unit performing signal processing of any two image signals selected from among the externally input image signal, the video graphic image signal output from the VGA engine, and the document/multimedia image signal output from the embedded member, and thus respectively and simultaneously outputting the two image signals to the first display member and the second display member.

The video presenting member may overlay the two image signals selected from among the externally input image signal, the video graphic image signal, and the document/multimedia image signal, and may output the image signals to at least one of the first display member and the second display member.

The image output unit may include a digital visual interface (DVI) converting unit converting the video graphic image signal, which is output from the VGA engine, into a DVI image signal; a DVI port outputting the DVI-converted image signal to the first display member; a switching unit performing a switching operation on the document/multimedia image signal output from the embedded member, or on the video graphic image signal output from the VGA engine; a digital-to-analog converter (DAC) converting the switched image signal into an analog image signal; and a D-SUB port outputting the analog image signal to the second display member.

The image output unit may include a DVI converting unit converting the video graphic image signal, which is output from the VGA engine, into a DVI image signal; a DVI port outputting the DVI-converted image signal to the first display member; a first switching unit performing a switching operation on the document/multimedia image signal output from the embedded member, or on the video graphic image signal output from the VGA engine; a DAC converting the switched image signal into an analog image signal; a second switching unit performing a switching operation on the analog image signal, or on the externally input image signal; and a D-SUB port outputting the second-switched image signal to the second display member.

The image output unit may include a first DVI converting unit converting the video graphic image signal, which is output from the VGA engine, into a DVI image signal; a first DVI port outputting the first DVI-converted image signal to the first display member; a first switching unit performing a switching operation on the document/multimedia image signal output from the embedded member, or on the video graphic image signal output from the VGA engine; an analog-to-digital converter (ADC) converting the externally input image signal into a digital signal; a second switching unit performing a switching operation on the first-switched image signal, or on the digitally converted external input image; a second DVI converting unit converting the second-switched image signal into a DVI image signal; and a second DVI port outputting the second DVI-converted image signal to the second display member.

The image output unit may include a first DVI converting unit converting the video graphic image signal, which is output from the VGA engine, into a DVI image signal; a first DVI port outputting the first DVI-converted image signal to the first display member; a first switching unit performing a switching operation on the document/multimedia image signal output from the embedded member, or on the video graphic image signal output from the VGA engine; a second DVI converting unit converting the first-switched image signal into a DVI image signal; a second DVI port receiving the externally input image signal; a second switching unit performing a switching operation on the second DVI-converted image signal or on the externally input image signal received via the second DVI port; and a third DVI port outputting the second-switched image signal to the second display member.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
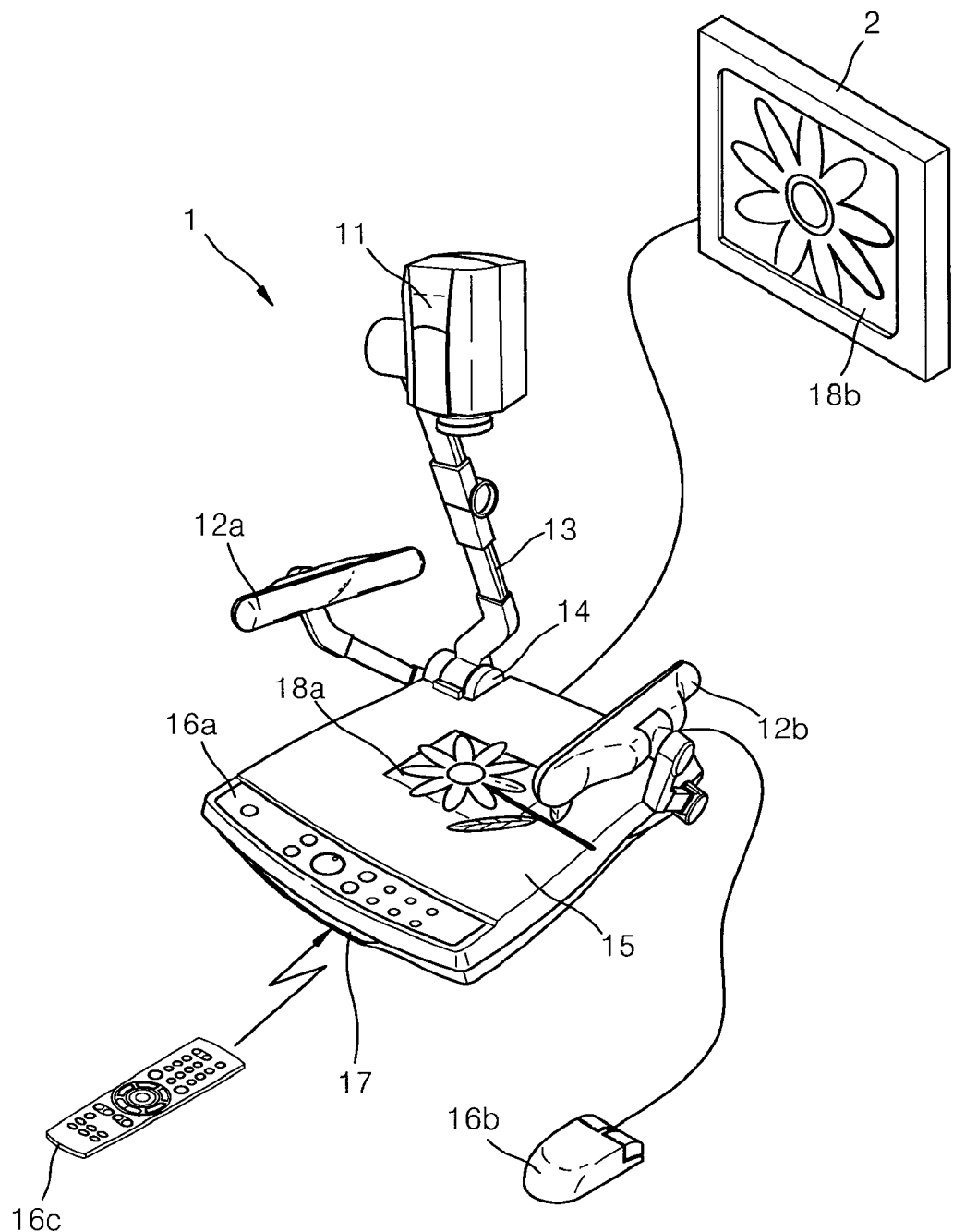
FIG. 1 is a diagram of an example of a video presenting system having outputs for dual images according to an embodiment of the present invention.

FIG. 1 is a diagram of an example of a video presenting system having outputs for dual images according to an embodiment of the present invention. Referring to the example of FIG. 1, the video presenting system includes a video presenting member 1 to which an embedded member is mounted. The video presenting system also includes a display unit 2 that displays a subject image 18b.

The video presenting member 1 includes an image sensing unit 11, illuminating apparatuses 12a and 12b, a support 13, a locking button 14, a subject board 15, an input member comprising a key input unit 16a, a mouse 16b, and a remote control 16c, a remote receiving unit 17, and a subject 18a.

The image sensing unit 11, which is capable of moving back-and-forth and rotating, includes an optical system and a photoelectric conversion unit. The optical system for optically processing a light received from the subject 18a includes a lens unit and a filter unit. The photoelectric conversion unit formed of a charge coupled device (CCD) or a complementary metal-oxide-semiconductor (CMOS) converts a light into an electrical analog signal, wherein the light is incident from the subject 18a via the optical system.

A user may move the support 13 by pressing the locking button 14. Another illuminating apparatus is internally installed under the subject board 15. The key input unit 16a or the mouse 16b is used to control driving of each unit such as the image sensing unit 11, the illuminating apparatuses 12a and 12b, and the like via user manipulation. Meanwhile, the user may input a control signal to the remote receiving unit 17 by manipulating the remote control 16c, thus, the user may control driving of each unit such as the image sensing unit 11, the illuminating apparatuses 12a and 12b, and the like.

Figure 2:
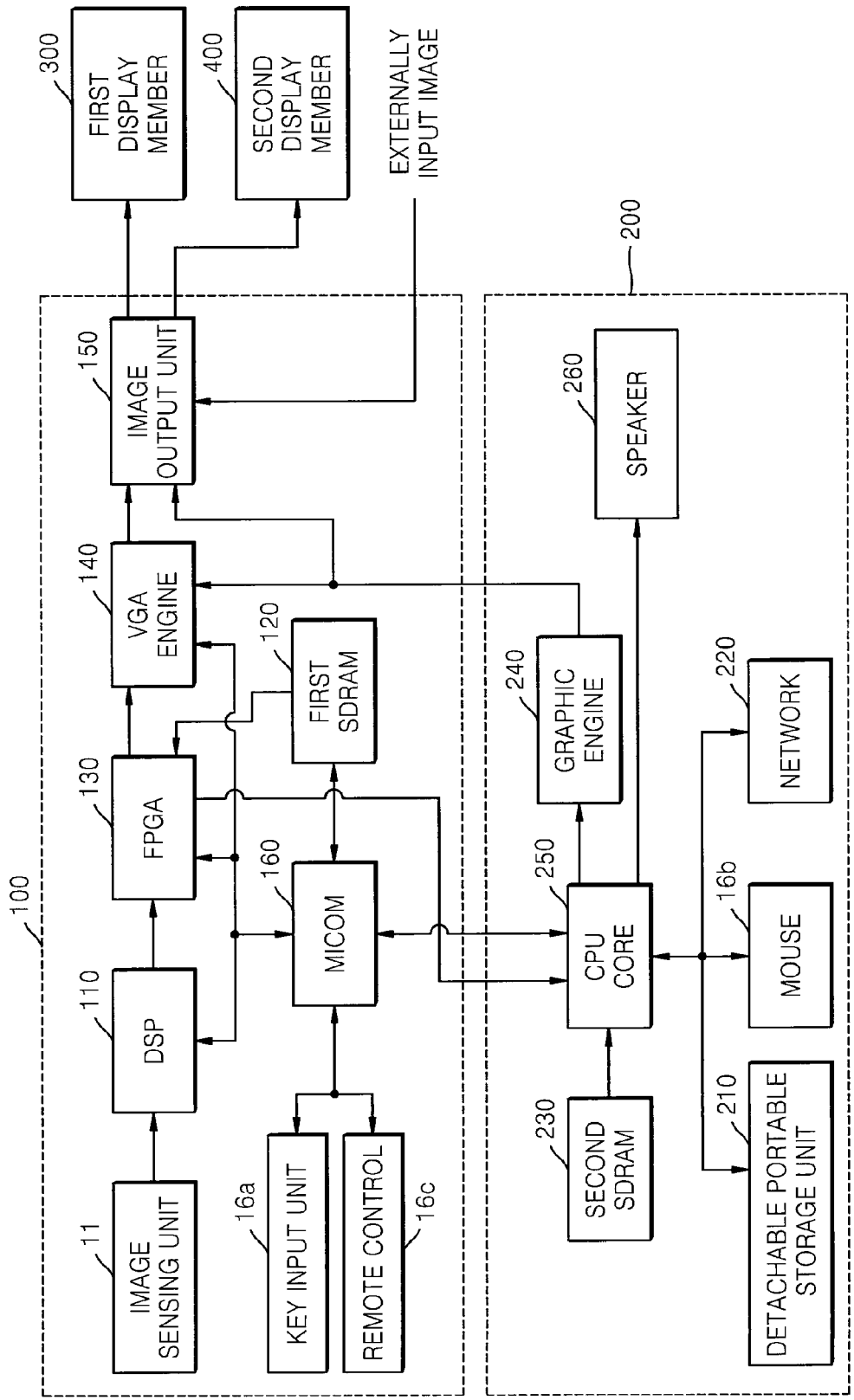
FIG. 2 is a block diagram of an example of an internal configuration of the video presenting system having outputs for dual images of FIG. 1.

FIG. 2 is a block diagram of an example of an internal configuration of the video presenting system having outputs for dual images of FIG. 1. The internal configuration of the video presenting system includes a video presenting member 100, an embedded member 200, a first display member 300, and a second display member 400.

The video presenting member 100 includes the image sensing unit 11, the input member 16 comprising the key input unit 16a and the remote control 16c, a digital signal processor (DSP) 110, a first synchronous dynamic random access memory (SDRAM) 120, a field-programmable gate array (FPGA) 130, a video graphics array (VGA) engine 140, an image output unit 150, and a micom 160.

The embedded member 200 includes the mouse 16b as the input member 16, a portable storage unit 210, a network 220, a second SDRAM 230, a graphic engine 240, a central processing unit (CPU) core 250, and a speaker 260.

The micom 160 of the video presenting member 100, and the CPU core 250 of the embedded member 200 mutually transmit and receive data by performing periodic communication. In this regard, the micom 160 and the CPU core 250 periodically exchange a maximum of 48 bytes data in synchronism with a vertical synchronization signal of a CCD.

With respect to the video presenting member 100, the image sensing unit 11 optically processes a light received from the subject 18a, and converts the light into an analog signal.

The DSP 110 converts a live image signal into a digital signal, wherein the live image signal is of the subject 18a and is generated by the image sensing unit 11, and performs various signal processing tasks for display. The DSP 110 eliminates a black level caused by a dark current generated in the CCD or a CMOS, which is sensitive to temperature variation, and performs a gamma correction in which information is encoded in accordance with nonlinearity of human perception. The DSP 110 performs a color filter array (CFA) interpolation in which a Bayer pattern, representing an RGRG line and a GBGB line which are gamma corrected data, is interpolated into an RGB line. Also, the DSP 110 performs an edge compensation in which an interpolated RGB signal is converted to a YUV signal, and a Y signal is filtered by a high-pass filter so that the image is clarified, performs a color correction in which color values of U and V signals are corrected by using a standard calorimetric system, and eliminates noise of the Y, U, and V.

As a frame memory, the first SDRAM 120 stores a live image of the live image signal processed by the DSP 110 in the unit of a frame.

As a memory control unit, the FPGA 130 provides the VGA engine 140 with the live image that is stored in the first SDRAM 120 in the unit of a frame.

The VGA engine 140 receives the live image from the FPGA 130, converts the live image into a composite image signal, and converts a document/multimedia file image into a composite image signal, wherein the document/multimedia file image is received from the embedded member 200. That is, the VGA engine 140 performs signal processing in which a scaling operation or a frame rate conversion is performed on the frame image (that is, "live image") received from the FPGA 130 and on the document/multimedia file image received from the embedded member 200, and overlays the frame image with the document/multimedia file image, thereby converting the frame image and the document/multimedia file image into the composite image signal. In another embodiment of the present invention, the VGA engine 140 may display a sub-image (for example, a live image) on a predetermined sized virtual window transmitted from the embedded member 200, and overlay the sub-image with a main image (for example, a document/multimedia file image), thereby outputting the composite image signal.

The image output unit 150 performs signal processing of any two image signals from among an image signal (for example, a PC signal) that is input, a video graphic signal that is output from the VGA engine 140, and the document/multimedia file image that is output from the embedded member 200, and outputs the two image signals to one or more of the first display member 300 and the second display member 400. A detailed description about the image output unit 150 will be described later with reference to the examples of FIGS. 3 through 6.

The micom 160 controls an overall operation of the video presenting member 100, and performs periodic communication with the embedded member 200. In particular, the micom 160 receives a dual-image display request signal via an input unit such as the key input unit 16a or the remote control 16c, and controls two image signals, from among the externally input image signal, the video graphic signal output from the VGA engine 140, and the document/multimedia file image output from the embedded member 200, to be output to the first display member 300 and the second display member 400 in a dual manner. In another embodiment of the present invention, the micom 160 controls the VGA engine 140 to overlay the live image, which is received from the FPGA 130, with the document/multimedia file image which is output from the embedded member 200. In another embodiment of the present invention, the micom 160 controls the VGA engine 140 to display a sub-image (for example, a live image) on a predetermined sized virtual window received from the embedded member 200, and to overlay the sub-image with a main image (for example, a document/multimedia file image).

With respect to the embedded member 200, the detachable portable storage unit 210 stores the document/multimedia file image, and the network 220 externally receives or externally transmits the document/multimedia file image.

The second SDRAM 230 is controlled by the CPU core 250 so as to store an image in the portable storage unit 210 or stores the document/multimedia file image received from the network 220, and stores a still image or a moving picture with respect to the live image received from the FPGA 130.

The graphic engine 240 is controlled by the CPU core 250 so as to receive the document/multimedia file image stored in the second SDRAM 230, to convert the document/multimedia file image into a digital image, and to output the digital image to the VGA engine 140.

The CPU core 250 controls an overall operation of the embedded member 200, and performs periodic communication with the micom 160 of the video presenting member 100.

Figure 3:
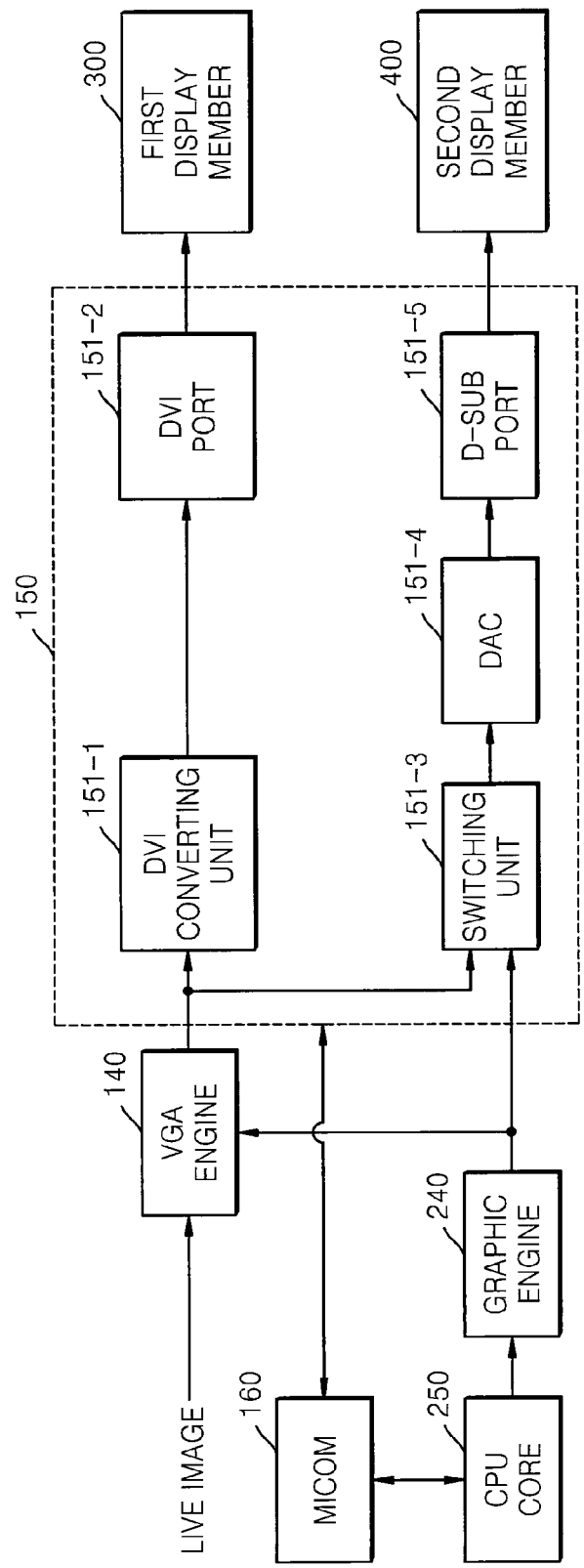
FIG. 3 is a detailed block diagram of an example of an image output unit of the video presenting system in FIG. 2 according to another embodiment of the present invention.

FIG. 3 is a detailed block diagram of an example of the image output unit 150 of the video presenting system in FIG. 2 according to another embodiment of the present invention. The image output unit 150 according to the embodiment of FIG. 3 includes a digital visual interface (DVI) converting unit 151-1, a DVI port 151-2, a switching unit 151-3, a digital-to-analog converter (DAC) 151-4, and a D-SUB port 151-5.

The DVI converting unit 151-1 converts a video graphic image signal, which is output from a VGA engine 140, into a DVI image signal.

The DVI port 151-2 outputs the DVI-converted image signal to a first display member 300.

The switching unit 151-3 performs a switching operation on a document/multimedia image signal which is received from a graphic engine 240 via a CPU core 250, or on the video graphic image signal which is output from the VGA engine 140. A switching control signal of the switching unit 151-3 is generated by a micom 160. The micom 160 controls the switching operation of the switching unit 151-3 according to a dual-image display request signal of an input unit such as a key input unit 16a or a remote control 16c.

When the video graphic image signal output from the VGA engine 140 is selected, an image signal to which an overlay is applied may be displayed.

The DAC 151-4 converts the switched image signal into an analog image signal.

The D-SUB port 151-5 outputs the analog image signal to a second display member 400.

Ultimately, when the switching unit 151-3 performs the switching operation on the document/multimedia image signal which is received from the graphic engine 240, the video graphic image signal, such as a live image that is output from the VGA engine 140, may be displayed on the first display member 300, and simultaneously the document/multimedia image signal received from the graphic engine 240 may be displayed on the second display member 400.

Figure 4:
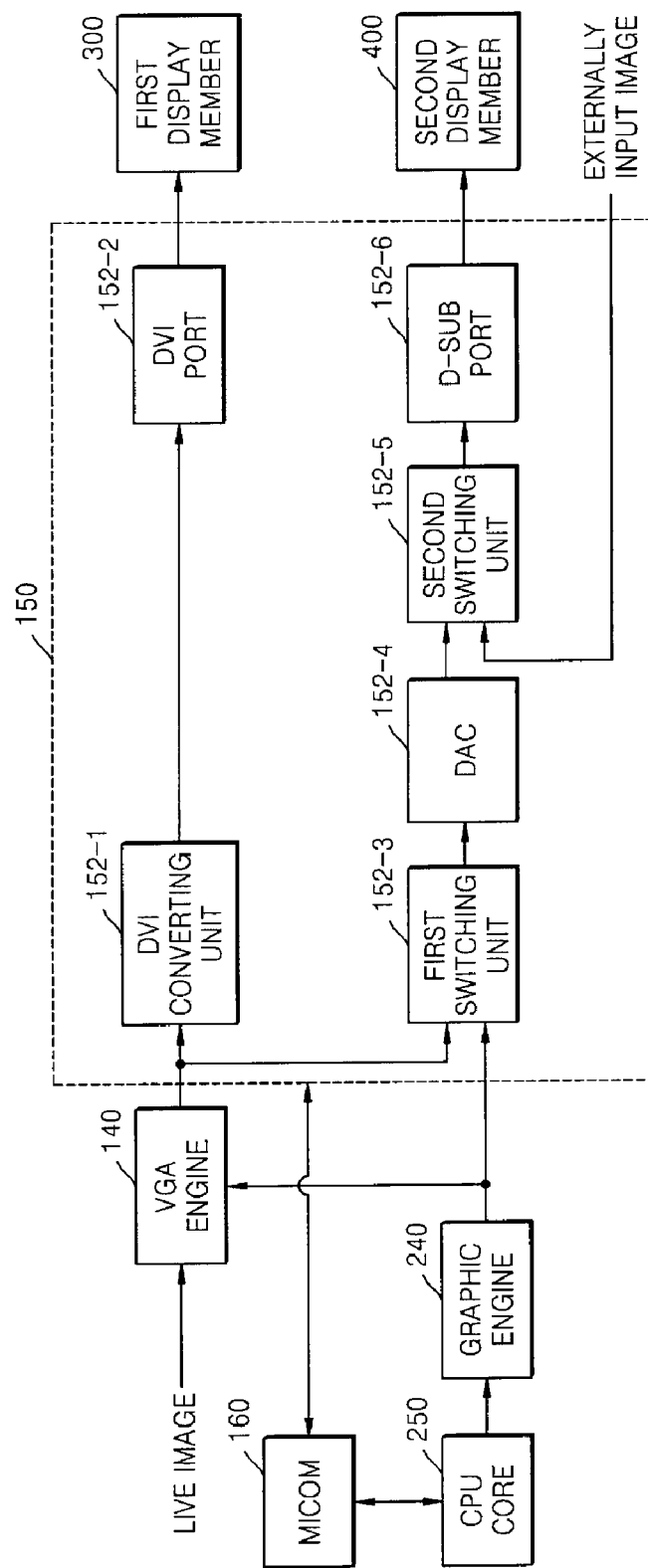
FIG. 4 is a detailed block diagram of an example of the image output unit of the video presenting system in FIG. 2 according to another embodiment of the present invention.

FIG. 4 is a detailed block diagram of an example of the image output unit 150 of the video presenting system in FIG. 2 according to another embodiment of the present invention. The image output unit 150 according to the embodiment of FIG. 4 includes a DVI converting unit 152-1, a DVI port 152-2, a first switching unit 152-3, a DAC 152-4, a second switching unit 152-5, and a D-SUB port 152-6. Compared to the embodiment of FIG. 3, the embodiment of FIG. 4 considers an externally input image, and then outputs an image.

The DVI converting unit 152-1 converts a video graphic image signal, which is output from a VGA engine 140, into a DVI image signal.

The DVI port 152-2 outputs the DVI-converted image signal to a first display member 300.

The first switching unit 152-3 performs a switching operation on a document/multimedia image signal which is received from a graphic engine 240 via a CPU core 250, or on the video graphic image signal which is output from the VGA engine 140. A switching control signal of the first switching unit 152-3 is generated by a micom 160. The micom 160 controls the switching operation of the first switching unit 152-3 according to a dual-image display request signal of an input unit such as a key input unit 16a or a remote control 16c.

When the video graphic image signal output from the VGA engine 140 is selected, an image signal to which an overlay is applied may be displayed.

The DAC 152-4 converts the switched image signal into an analog image signal.

The second switching unit 152-5 performs a switching operation on the converted analog image signal or on an externally input image signal such as a PC signal. A switching control signal of the second switching unit 152-5 is generated by the micom 160. The micom 160 controls the switching operation of the second switching unit 152-5 according to a dual-image display request signal of an input unit such as a key input unit 16*a* or a remote control 16*c*.

The D-SUB port 152-6 outputs the second-switched image signal to a second display member 400.

With respect to the embodiments of FIGS. 3 and 4, output ports of the video presenting system are configured to be DVI/D-SUB ports. However, the output ports of the video presenting system may be configured to be DVI/DVI dual ports, and this case will be described with reference to the examples of FIGS. 5 and 6.

Figure 5:
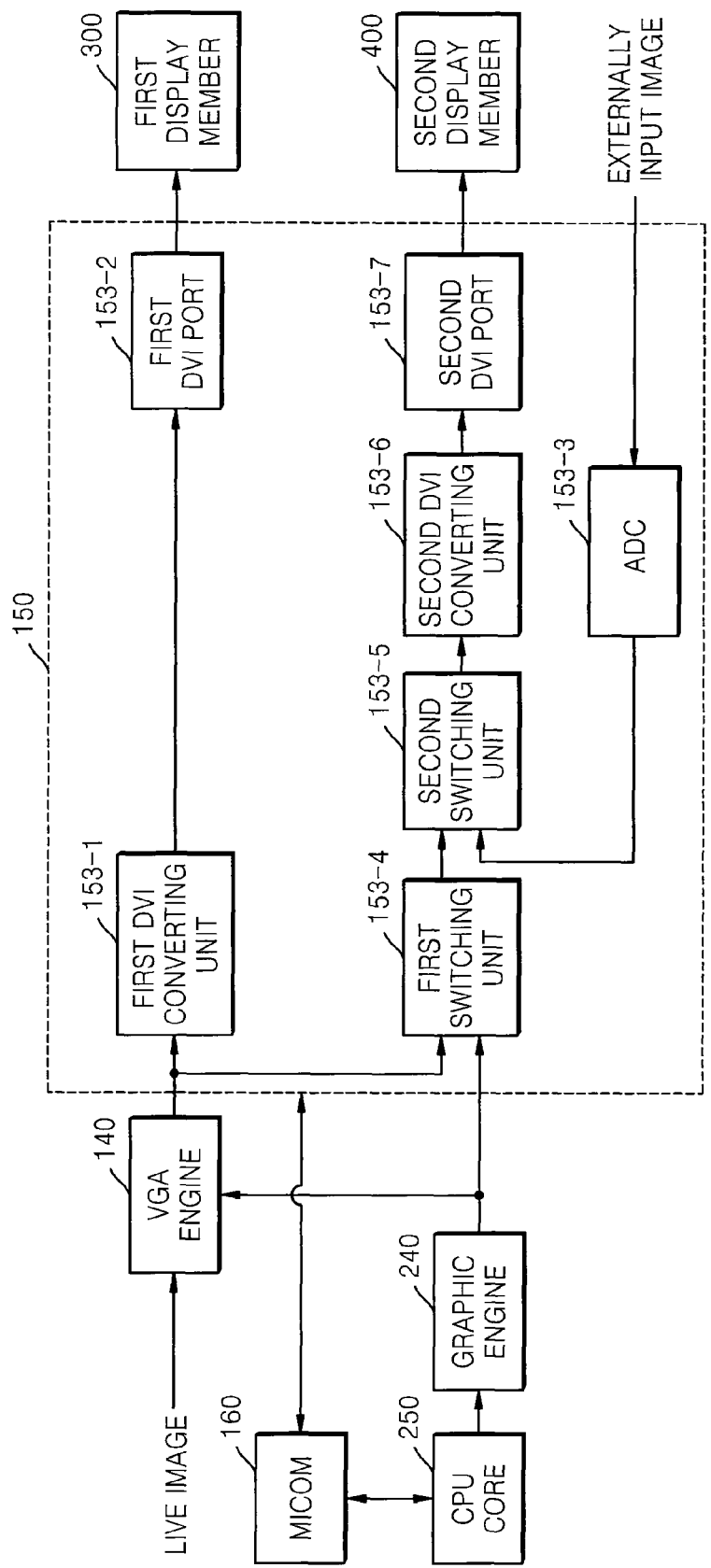
FIG. 5 is a detailed block diagram of an example of the image output unit of the video presenting system in FIG. 2 according to another embodiment of the present invention.

FIG. 5 is a detailed block diagram of an example of the image output unit 150 of the video presenting system in FIG. 2 according to another embodiment of the present invention. The image output unit 150 according to the embodiment of FIG. 5 includes a first DVI converting unit 153-1, a first DVI port 153-2, an analog-to-digital converter (ADC) 153-3, a first switching unit 153-4, a second switching unit 153-5, a second DVI converting unit 153-6, and a second DVI port 153-7.

The first DVI converting unit 153-1 converts a video graphic image signal, which is output from a VGA engine 140, into a DVI image signal.

The first DVI port 153-2 outputs the DVI-converted image signal to a first display member 300.

The ADC 153-3 converts an externally input image signal such as a PC signal into a digital signal.

The first switching unit 153-4 performs a switching operation on a document/multimedia image signal which is received from a graphic engine 240 via a CPU core 250, or on a video graphic image signal which is output from the VGA engine 140. A switching control signal of the first switching unit 153-4 is generated by a micom 160. The micom 160 controls the switching operation of the first switching unit 153-4 according to a dual-image display request signal of an input unit such as a key input unit 16*a* or a remote control 16*c*. When the video graphic image signal output from the VGA engine 140 is selected, an image signal to which an overlay is applied may be displayed.

The second switching unit 153-5 performs a switching operation on the first-switched image signal or on the externally input image signal that is digitally converted by the ADC 153-3. A switching control signal of the second switching unit 153-5 is generated by the micom 160. The micom 160 controls the switching operation of the second switching unit 153-5 according to a dual-image display request signal of an input unit such as a key input unit 16*a* or a remote control 16*c*.

The second DVI converting unit 153-6 converts the image signal switched by the second switching unit 153-5 into a DVI image signal.

The second DVI port 153-7 outputs the second DVI-converted image signal to a second display member 400.

Figure 6:
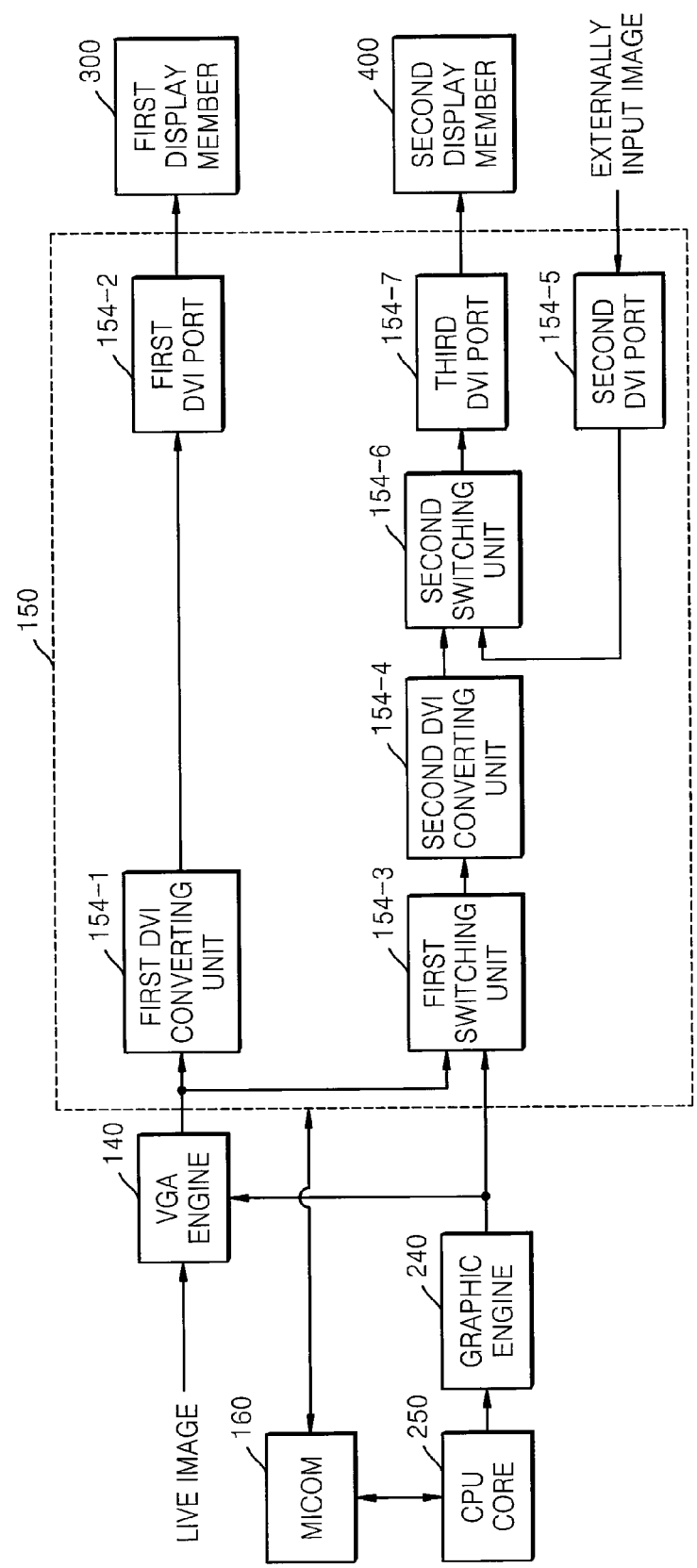
FIG. 6 is a detailed block diagram of an example of the image output unit of the video presenting system in FIG. 2 according to another embodiment of the present invention.

FIG. 6 is a detailed block diagram of an example of the image output unit 150 of the video presenting system in FIG. 2 according to another embodiment of the present invention. The image output unit 150 according to the embodiment of FIG. 6 includes a first DVI converting unit 154-1, a first DVI port 154-2, a first switching unit 154-3, a second DVI converting unit 154-4, a second DVI port 154-5, a second switching unit 154-6, and a third DVI port 154-7.

The first DVI converting unit 154-1 converts a video graphic image signal, which is output from a VGA engine 140, into a DVI image signal.

The first DVI port 154-2 outputs the DVI-converted image signal to a first display member 300.

The first switching unit 154-3 performs a switching operation on a document/multimedia image signal which is received from a graphic engine 240 via a CPU core 250, or on a video graphic image signal which is output from the VGA engine 140. A switching control signal of the first switching unit 154-3 is generated by a micom 160. The micom 160 controls the switching operation of the first switching unit 154-3 according to a dual-image display request signal of an input unit such as a key input unit 16*a* or a remote control 16*c*. When the video graphic image signal output from the VGA engine 140 is selected, an image signal to which an overlay is applied may be displayed.

The second DVI converting unit 154-4 converts the switched image signal, which is output from the first switching unit 154-3, into a DVI image signal.

The second DVI port 154-5 receives an externally input image signal such as a PC signal.

The second switching unit 154-6 performs a switching operation on the second DVI-converted image signal or on the externally input image signal which is received via the second DVI port 154-5. A switching control signal of the second switching unit 154-6 is generated by the micom 160. The micom 160 controls the switching operation of the second switching unit 154-6 according to a dual-image display request signal of an input unit such as a key input unit 16*a* or a remote control 16*c*.

The third DVI port 154-7 outputs the second-switched image signal to a second display member 400.

In this manner, the video presenting system having outputs for dual images according to the embodiments of the present invention may freely realize analog/digital outputs. By using the video presenting system, different images may be respectively output to different ports, and simultaneously an externally input image signal may also be selected. Thus, a user selection may be maximized.

Also, resolutions of two output ports may differ. For example, a live image output resolution of the video presenting member 100 may be 1280×960 or 1280×720, while a document/multimedia file image resolution of the embedded member 200 may be 1280×1024, 1280×960, 1024×768 or 1280×720. By doing so, the user may display the live image on a flat display such as plasma display panel (PDP)/liquid crystal display (LCD) in a 720P HD mode, and display the live image on a PC having a 1280×1024 resolution that meets a standard Video Electronics Standards Association (VESA) specification.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A video presenting system having outputs for dual images, the video presenting system comprising:
   a first display member;
   a second display member;
   a video presenting member generating a live image signal, and outputting a dual-display signal after performing signal processing of the live image signal, an externally input image signal, and a document/multimedia image signal; and
   an embedded member performing periodic communication with the video presenting member, and thus transmitting the externally input image signal and the document/multimedia image signal to the video presenting member,
   wherein the video presenting member comprises:
      a VGA (video graphics array) engine outputting a video graphic image signal after performing signal processing of the live image signal and the document/multimedia image signal which is received from the embedded member; and an image output unit performing signal processing of any two image signals selected from among the externally input image signal, the video graphic image signal output from the VGA engine, and the document/multimedia image signal output from the embedded member, and thus respectively and simultaneously outputting the two image signals to the first display member and the second display member.

2. The video presenting system of claim 1, wherein the video presenting member overlays the two image signals selected from among the externally input image signal, the video graphic image signal, and the document/multimedia image signal, and outputs the image signals to at least one of the first display member and the second display member.

3. The video presenting system of claim 1, wherein the image output unit comprises:
- a DVI (digital visual interface) converting unit converting the video graphic image signal, which is output from the VGA engine, into a DVI image signal;
- a DVI port outputting the DVI-converted image signal to the first display member;
- a switching unit performing a switching operation on the document/multimedia image signal output from the embedded member, or on the video graphic image signal output from the VGA engine;
- a DAC (digital-to-analog converter) converting the switched image signal into an analog image signal; and
- a D-SUB port outputting the analog image signal to the second display member.

4. The video presenting system of claim 1, wherein the image output unit comprises:
- a DVI converting unit converting the video graphic image signal, which is output from the VGA engine, into a DVI image signal;
- a DVI port outputting the DVI-converted image signal to the first display member;
- a first switching unit performing a switching operation on the document/multimedia image signal output from the embedded member, or on the video graphic image signal output from the VGA engine;
- a DAC converting the switched image signal into an analog image signal;
- a second switching unit performing a switching operation on the analog image signal, or on the externally input image signal; and
- a D-SUB port outputting the second-switched image signal to the second display member.

5. The video presenting system of claim 1, wherein the image output unit comprises:
- a first DVI converting unit converting the video graphic image signal, which is output from the VGA engine, into a DVI image signal;
- a first DVI port outputting the first DVI-converted image signal to the first display member;
- a first switching unit performing a switching operation on the document/multimedia image signal output from the embedded member, or on the video graphic image signal output from the VGA engine;
- an ADC (analog-to-digital converter) converting the externally input image signal into a digital signal;
- a second switching unit performing a switching operation on the first-switched image signal, or on the digitally converted external input image;
- a second DVI converting unit converting the second-switched image signal into a DVI image signal; and
- a second DVI port outputting the second DVI-converted image signal to the second display member.

6. The video presenting system of claim 1, wherein the image output unit comprises:
- a first DVI converting unit converting the video graphic image signal, which is output from the VGA engine, into a DVI image signal;
- a first DVI port outputting the first DVI-converted image signal to the first display member;
- a first switching unit performing a switching operation on the document/multimedia image signal output from the embedded member, or on the video graphic image signal output from the VGA engine;
- a second DVI converting unit converting the first-switched image signal into a DVI image signal;
- a second DVI port receiving the externally input image signal;
- a second switching unit performing a switching operation on the second DVI-converted image signal or on the externally input image signal received via the second DVI port; and
- a third DVI port outputting the second-switched image signal to the second display member.

* * * * *